April 3, 1956     E. R. VAN KREVELEN     2,740,598
APPARATUS FOR REMOTE CONTROL OF BALLOON ALTITUDE
Filed March 10, 1953     5 Sheets-Sheet 1
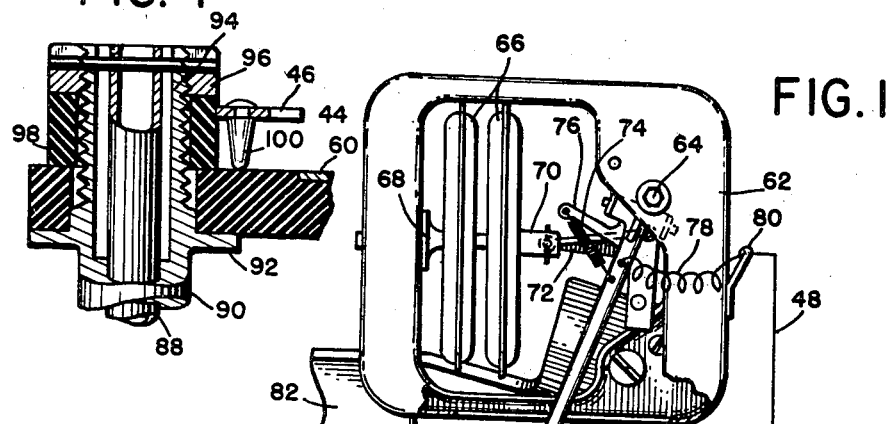
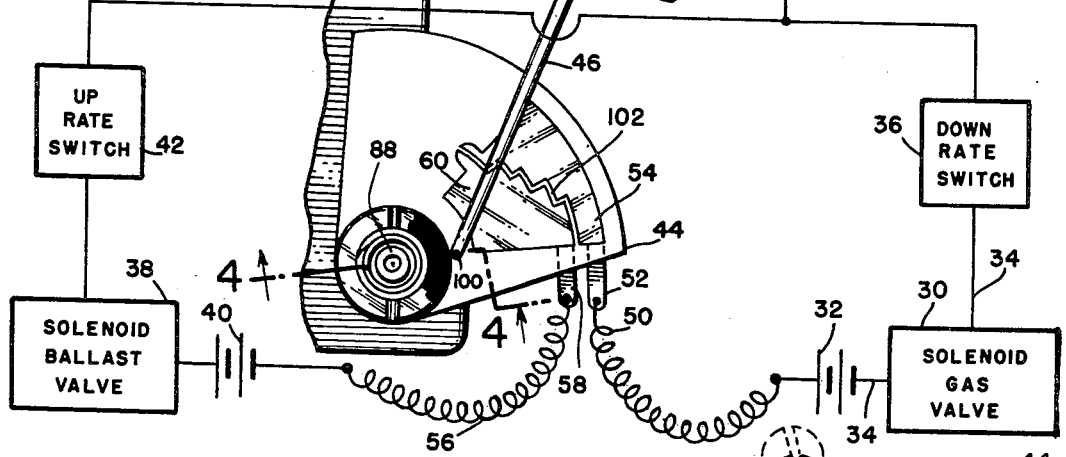
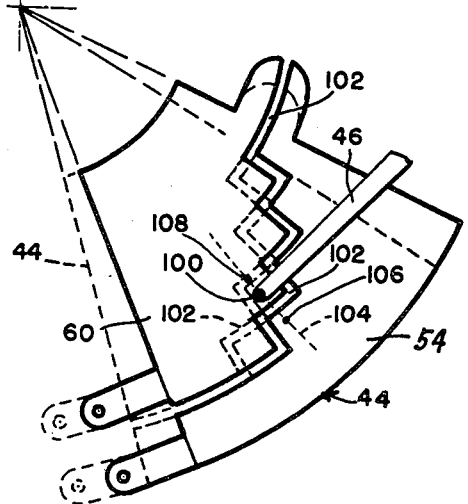
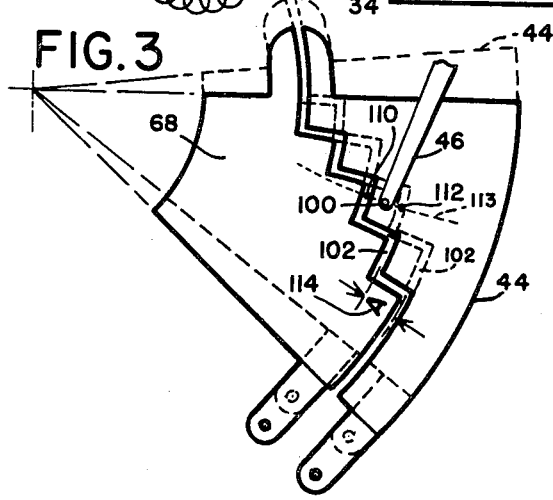
INVENTOR
EDWARD R. VAN KREVELEN
BY William C. Stueber    ATTORNEY April 3, 1956   E. R. VAN KREVELEN   2,740,598
APPARATUS FOR REMOTE CONTROL OF BALLOON ALTITUDE
Filed March 10, 1953   5 Sheets-Sheet 2

INVENTOR
EDWARD R. VAN KREVELEN
BY William C. Stueber ATTORNEY

April 3, 1956     E. R. VAN KREVELEN     2,740,598
APPARATUS FOR REMOTE CONTROL OF BALLOON ALTITUDE
Filed March 10, 1953     5 Sheets-Sheet 3

INVENTOR
EDWARD R. VAN KREVELEN
BY William C. Stueber
ATTORNEY

April 3, 1956  E. R. VAN KREVELEN  2,740,598
APPARATUS FOR REMOTE CONTROL OF BALLOON ALTITUDE
Filed March 10, 1953  5 Sheets-Sheet 4

INVENTOR
EDWARD R. VanKREVELEN
BY William C. Stueber ATTORNEY

April 3, 1956  E. R. VAN KREVELEN  2,740,598
APPARATUS FOR REMOTE CONTROL OF BALLOON ALTITUDE
Filed March 10, 1953  5 Sheets-Sheet 5

INVENTOR
EDWARD R. VAN KREVELEN
BY William C. Stueber ATTORNEY

United States Patent Office 2,740,598
Patented Apr. 3, 1956

2,740,598

APPARATUS FOR REMOTE CONTROL OF BALLOON ALTITUDE

Edward R. Van Krevelen, Robbinsdale, Minn., assignor to General Mills, Inc., a corporation of Delaware Application March 10, 1953, Serial No. 341,464

20 Claims. (Cl. 244—96)

The invention relates to devices for selectively controlling the floating altitude of a balloon from a position remote from the balloon and to apparatus for transmitting return signals from the balloon relating to the control of the balloon.

In flying balloons carrying a payload, apparatus has heretofore been provided for automatically controlling the altitude of the balloon so that the balloon will float at a constant and predetermined level. This is advantageous for many purposes such as, for example, where spaced successive readings of the conditions of the air are to be taken at the same altitude. An example of an apparatus for constant altitude control is disclosed in the copending application Balloon Altitude Control, Glenn L. Mellen, Serial No. 324,761, filed December 8, 1952.

In many instances it has become desirable to selectively change the altitude of the balloon after it has reached its flying altitude. If the altitude of a balloon can be controlled from a signal on the ground, the observer who is flying the balloon may send it to whatever altitude he desires to obtain readings.

Another advantage of being able to remotely control the altitude of a balloon is the saving of lifting gas which may be effected when the balloon is flown over a long period of time. Normally, with a non-selectable constant altitude device, gas must be discharged from the balloon to keep it at constant altitude when the gas becomes heated by the morning sun and increases in volume and lifting ability. As evening approaches, ballast must be discharged to compensate for the loss of free lift of the gas which now becomes cool and loses lift, thereby wasting ballast. If the floating altitude of a balloon can be remotely selected, the natural phenomena of the cooling and heating of the gas may be taken advantage of by changing the flying altitude of the balloon and no gas need be discharged and no ballast need be lost since a higher altitude can be selected during the day and a lower altitude at night. There are many other advantages which accrue to a balloon which can be flown at various selectable altitudes and these advantages are readily recognizable and often depend upon the purpose for which the balloon is flown.

Accordingly, it is an object of the invention to provide an altitude control mechanism for a balloon which will keep the balloon floating evenly at the altitude at which it is set and which can be selectively set to maintain the balloon at desired altitudes by a signal from the ground.

Another object of the invention is to utilize the apparatus which is employed for controlling the altitude of the balloon to also return information of the balloon's location and information of the setting of the mechanism, thereby eliminating the necessity for furnishing additional telemetering apparatus.

Another object of the invention is to provide an automatic balloon control apparatus which will hold the balloon at a predetermined selectable altitude and which will function to either increase or decrease the free lift of the balloon to obtain a precision control of the balloon.

A still further object of the invention is to provide apparatus for varying the rate of decrease or increase of free lift in proportion to the distance the balloon is away from its pre-selected altitude.

A further object of the invention is to provide a balloon altitude control apparatus which is controllable from the ground and which transmits back to the ground the information of the setting of the control, in addition to other data.

A further object of the invention is to provide apparatus for scheduling the functions of a telemetering apparatus in a free floating balloon so that a single unit of apparatus may be used for transmitting various types of data and also for receiving signals sent from the ground to control the balloon and so that the observer will always know the quantity represented by the signal he is receiving.

A still further object of the invention is to provide an altitude control device operated by a signal transmitted from the ground and providing the device with a plurality of positions for flying the balloon at various altitudes and with an additional position to terminate the flight.

Other objects and advantages will become apparent in the following specification and claims, taken with the accompanying drawings, in which Figure 1 is a plan view, partially in schematic, illustrating the apparatus carried by the balloon for maintaining the balloon at a constant level;

Figs. 2 and 3 are enlarged plan views of the commutator or contact plate on which the contact arm rides to selectively control the floating altitude of the balloon;

Fig. 4 is an enlarged detail section taken along lines 4—4 of Fig. 1;

Figure 10:
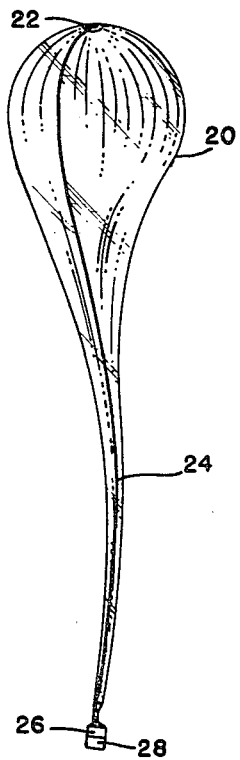
Fig. 10 is an elevational view of a balloon carrying the controls of the present invention.

In Fig. 10 is shown a balloon 20 which is equipped with the altitude control mechanism of the present invention. The balloon may be of any suitable material, preferably a light-weight plastic for enabling it to ascend to high altitudes and contains a lifting gas which causes support of the balloon and its payload. At the top of the balloon is a gas valve 22 which is normally held shut but which may be operated to release the gas from the balloon and decrease its free lift, causing it to descend. For an automatic control device, such as disclosed herein, the gas release valve is preferably a solenoid valve which will open to release gas when energized by electrical signal.

To carry the electrical signal to the balloon top, wires 24 are led along the side of the balloon and run down into an instrument and control box 26 carried by the balloon. Within the instrument and control box are carried batteries to provide electrical energy, the altitude control, and the radio transmitting and receiving equipment.

Beneath the instrument box at 28 is a ballast container from which ballast is discharged to increase the free lift of the balloon and cause it to ascend. The ballast may be a liquid type and be discharged through a solenoid valve, not shown, which is also operated by an electric current originating in the instrument box.

Thus the free lift of the balloon may be changed by releasing lifting gas or by discharging ballast. By remotely operating these lift changing elements, the altitude at which the balloon will fly will be controlled.

On the ground at 29 is a radio receiving and transmitting station which receives signals from the balloon. The radio also transmits control signals which determine the floating altitude of the balloon.

Turning now to Fig. 1, the mechanism which is located within the instrument box for controlling the balloon altitude is shown. The solenoid gas valve, shown schematically at 30, is energized by electric current from a battery 32 which is supplied it when the circuit represented by leads 34 is completed. Also in the circuit is a down rate switch 36 which may be the rate switch of the mechanical or chemical type known to the balloon art. The up rate switch is normally closed to complete the circuit but functions to open the circuit in the event the rate of altitude rise becomes excessive. Thus, if the balloon is suddenly temporarily caught in an up draft, this temporary increase in altitude will not cause the gas valve to open to waste gas. However, if the increase in altitude is slow, such as normally occurs when the balloon begins to gain altitude from the gas taking on heat from the sun or the like, the rate switch remains closed to permit the solenoid gas valve to operate.

The solenoid ballast valve 38 is shown to the left of Fig. 1 being energized by a battery 40 which must complete its circuit through the up rate switch 42. This rate switch is normally closed and similar to the down rate switch but operates to open the circuit when the rate of altitude increase of the balloon is greater than a predetermined amount. Thus when the balloon is released on the ground, if it were not for the rate switch, the balloon would continue dropping ballast all during ascent until it reaches its floating altitude. The rate switch keeps the circuit open and prevents unnecessary loss of ballast while the balloon is ascending rapidly. If, however, the balloon should be caught under a temperature inversion, its rate of ascent will slow down greatly and the rate switch will close, permitting the balloon to drop ballast and aiding it in passing through the inversion.

The circuits through the gas valve and ballast valve are completed through the conducting areas 54 and 60 of a non-conducting plate 44, which is engaged by a contact arm 46 which has a contact point 100 at its free end. Both circuits are connected to the contact arm through a lead 48. The circuit from the solenoid gas valve through the battery 32 is completed through a lead 50 connected to a terminal 52 on a conducting area 54. Engagement of the area 54 by the contact arm 46 completes the circuit. The circuit through the solenoid ballast valve is completed through a lead 56 connected to a terminal 58 on the contact area 60. This circuit is completed when the contact arm rides on the conducting area 60.

The non-conducting plate 44 is itself formed of a non-conducting material so that when the contact point 100 is in the position of Fig. 1, the circuits are open. Also, when the point is in the space 102, between the areas 44 and 60, the circuits are open.

The position of the contact arm 46 and whether or not it rides on the conducting area 60 or the conducting area 54 is determined by various factors, one of them being the pressure of the surrounding air. The arm 46 is pivotally mounted in a frame 62 to swing about a pivotal point 64 and its pivotal position is controlled by an aneroid cell shown in the form of a set of bellows 66. The bellows are mounted in the open frame 62, being secured at point 68 and have a movable connection 70 connected to a link 72 which pivots the contact arm 46 as it reciprocates. A tension spring 74 is connected between the arm 46 and an arm 76 which is fixed to the frame and functions to take up the lost motion in the linkage. The details of the structure of the aneroid cell and movable contact arm assembly are well known to those skilled in the art and it is not necessary to describe them in full detail. The wiring connection from lead 48 to the arm 46 is completed by a flexible lead 78 supported on a bracket 80 on the open frame.

A frame piece 82 (Figs. 1 and 8) supports the open frame 62 and the elements associated with the contact plate 44. The frame piece 82 is suitably supported on a bracket-like framepiece 84 (Figs. 7 and 8) which is mounted to extend from a main frameplate 86. This main frameplate is secured within the instrument box 26 which is carried on the balloon.

The non-conducting plate 44 which carries the contact areas 60 and 54 is pivotally mounted and is pivotally movable in a succession of measured steps so as to change its position relative to the contact arm 46. The non-conducting plate is carried on a supporting post 88 which extends upwardly from the frame 82. The details of the post and the mounting for the non-conducting plate are shown in Fig. 4. The post 88 extends through a sleeve 90 which acts as the bearing within the frame and which has a flange 92 on which rests the contact plate 44. The sleeve 90 has a threaded upper portion 94 on which is threaded a nut 96 to hold the non-conducting plate 44 down against the flange 92. Between the nut and the plate is an insulating collar 98. The function of this collar is to prevent the shorting of the contact arm 46 when the arm is positioned, as is shown in Fig. 4, when the balloon is on the ground.

When the balloon ascends, the aneroid cell 66 will expand, pushing the contact arm 46 away from the center post and out onto the contact areas 60 and 54. It will be noted that these contact areas are metallic and are mounted in the non-conducting plate 44 which of course is formed of a non-conducting material. The conducting areas 60 and 54 are recessed into the non-conducting material of the contact plate so that the contact point 100 (see Fig. 4) may easily ride from the non-conducting to the conducting areas.

It will be noted in Fig. 1 that the conducting areas 60 and 54 are separated by a narrow zone of non-conducting material 102 so as to be insulated from each other. The non-conducting zone 102 is formed of a series of line segments. The zone is composed of arcuately shaped short lines having their ends joined by short radial lines, each successive arcuate line being closer to the center of the plate 44.

When the balloon is released at ground level, it begins to rise and as the aneroid cells expand, the contact arm is first swung over the area 60. As the contact point rides across the area 60, the circuit to the solenoid ballast valve is completed through the arm 46 and area 60 but since the balloon is ascending rapidly the rate switch 42 opens the circuit and prevents the loss of ballast. Should the rate of rise of the balloon decrease to where the rate switch closes, the circuit will be complete and ballast will begin dropping to increase the rate of rise.

Figure 5:
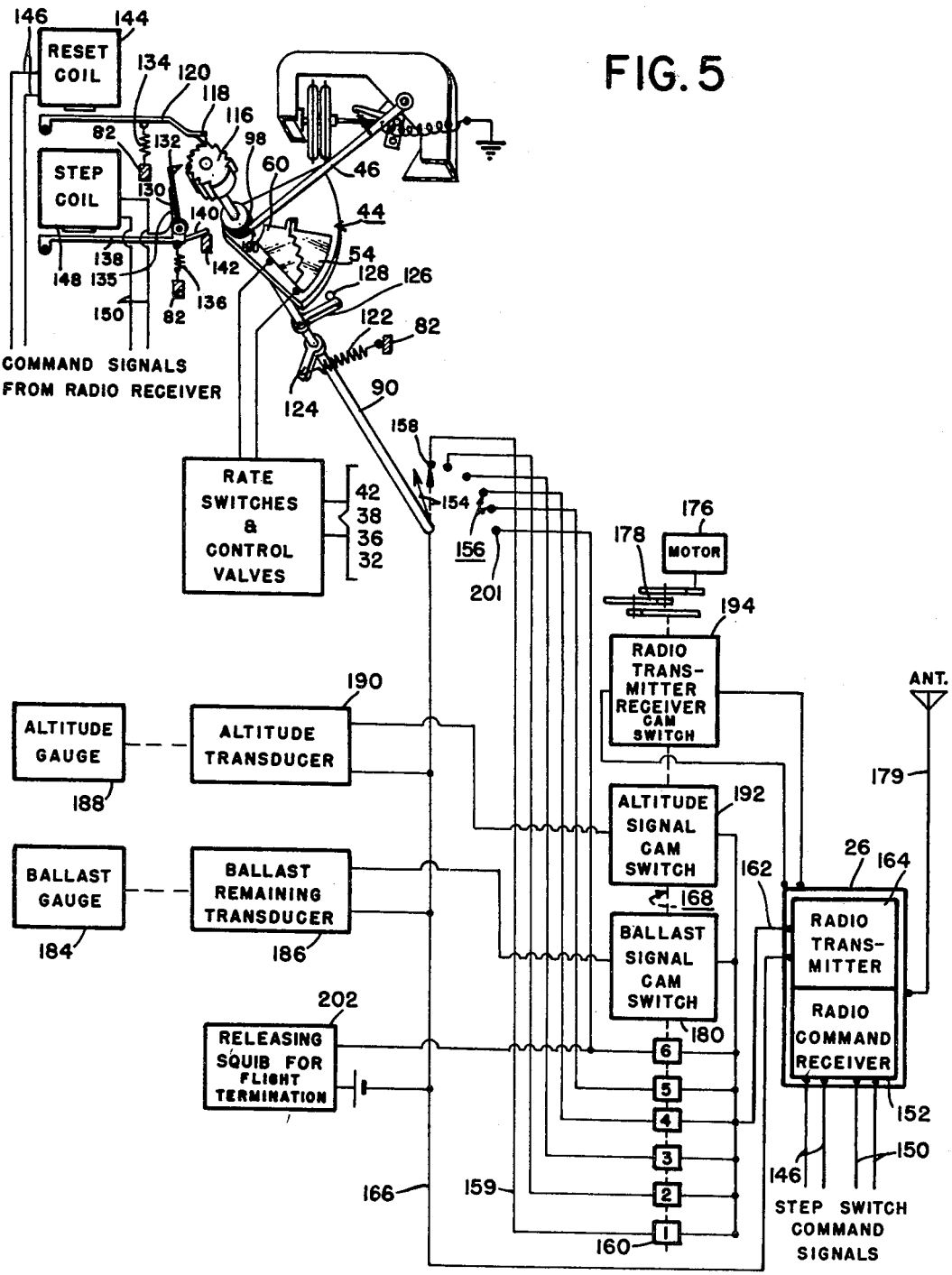
Fig. 5 is a schematic diagram of the apparatus carried by the balloon for controlling its altitude and for transmitting information back to the ground control location.

As shown in Fig. 1, the non-conducting plate 44 has been rotated to a neutral position where the contact point 100 will not ride across the conducting areas. In flight, however, the non-conducting plate is rotated to a position where the point 100 will engage the conducting area, for example, as shown in Fig. 5. It is the rotational position of this non-conducting plate which determines on which of the conducting areas the contact point 100 will rest and which determines the floating altitude of the balloon, as will presently be described.

Referring to Fig. 2, the contact arm 46 is shown with the contact point 100 resting on the contact area 60. As described in connection with Fig. 1, the contact area 60 is in circuit with the solenoid ballast valve and the contact point resting on that area completes the circuit through the ballast valve, opening the valve and causing ballast to be discharged. As the balloon ascends, the contact point 100 will be caused to swing along the dotted line indicated at 104, crossing the narrow non-conducting area 102 until it moves onto the conducting area 54 in the position indicated at 106. Again, as was described in connection with Fig. 1, the area 54 is in circuit with the solenoid gas valve and, therefore, when the contact point rests on that area, the circuit will be completed through the gas valve causing it to open to release gas from the balloon. This decreases the free lift of the balloon, causing it to descend to once more return to its proper altitude. As it does so, the arm 46, influenced by the aneroid cell, once again carries the contact point onto the non-conducting area 102 where the gas valve will close to stop discharging gas.

As long as the contact point 100 rests on the non-conducting area 102, both the ballast valve and the gas valve will be inactive and the free lift of the balloon will remain constant to hold it at its proper altitude. If, due to various conditions such as change in temperature or gas loss by diffusion through the balloon material, the balloon varies from its proper altitude, the arm 46 with its contact point 100 will cause the operation of either the ballast or the gas valve to return the balloon to its proper altitude.

If the observer on the ground who is the balloon operator wishes to change the floating altitude of the balloon, he changes the rotational position of the contact plate.

When the contact plate and contact arm are in the solid line position shown in Fig. 2, the contact point 100 then rests on area 60 and the solenoid ballast valve is in operation causing the balloon to ascend. If, for example, the observer should wish to have the balloon float at a lower altitude, he can stop its ascension and cause it to begin to descent to the altitude at which he desires it to fly. To accomplish this, the non-conducting plate 44 is pivoted one index step in a clockwise direction from the solid line to the dotted line position of Fig. 2. Looking now at the contact point 100, it will be seen that the contact areas have been moved and it has changed position moving from the contact area 60 to the contact area 54.

This means that the circuit to the ballast valve will have been broken and the circuit to the solenoid gas valve will have been completed. The discharge of the ballast will have terminated and the operation of the gas valve will cause the balloon to vent gas. The venting of gas will decrease the free lift of the balloon causing it to descend and the motion of the balloon will have changed from an ascending to a descending direction. The balloon will continue to descend until the aneroid cell draws the arm over to where the contact point is at the position indicated at 108 which will be in the narrow non-conducting area 102. At this position the balloon will have dropped to a lower altitude and will maintain that altitude, controlled by the ballast and gas valves.

Fig. 3 is shown to illustrate the action of the contact arm and the contact plate when the floating altitude of the balloon is to be changed from a lower to a higher altitude, as contrasted in Fig. 2 where the floating altitude was changed from a higher to a lower altitude. The solid lines show the contact arm 46 with the contact point 100 engaging the contact area 54 which closes the circuit through the solenoid gas valve. Normally, the release of gas will continue until the balloon drops to the desired altitude, whereupon the aneroid cell will have brought the arm 46 to the point 110 which lies in the narrow non-conducting zone 102. If, however, the observer wishes to cause the balloon to stop descending and move to a higher altitude, the position of the non-conducting plate 44 is changed by rotating it so that the contact areas move from the solid to the dotted line position of Fig. 3. This movement of the contact areas relative to the contact point moves the point 100 from the conducting area 54 onto conducting area 60, which closes the circuit to the ballast valve causing it to open and opens the circuit to the gas valve causing it to close. As the balloon begins dropping ballast, it will continue to do so until the increase in altitude causes the contact point to swing over the location indicated at 112, which will be the desired floating altitude of the balloon. In flight the balloon will change altitude slightly due to natural factors such as air currents, loss of gas through the balloon material, etc. As it does, the contact point 100 will swing back and forth along dotted line 113 to cause a correction of the altitude.

Thus it will be readily seen that each one of the steps or jogs between the contact areas 54 and 60 represent a different floating altitude for the balloon. By indexing the contact areas 54 and 60 clockwise, the balloon will be caused to descend to successively lower altitudes and by indexing the contact areas in a counter-clockwise direction, the balloon will be caused to ascend to successively higher altitudes. The indexing mechanism is constructed to rotate the contact areas a step at a time so that the altitude may be selectively chosen.

It will be evident that the altitude at which the instrument will cause the balloon to fly is determined by the relative positions of the contact arm and the conducting areas 60 and 54. For example, the length of the steps between index positions, as illustrated by the letter A at 114 of Fig. 3, will determine the difference in floating altitude between the index steps.

By shortening or lengthening the distance A, (Fig. 3) the change in altitude between index steps may be decreased or increased. The difference in floating altitude between the steps represented by the solid line and dotted line positions of Fig. 2 or Fig. 3 could be, for example, 5,000 feet, or it could be greater or smaller.

The mechanism for changing the index positions of the contact plate 44 is shown schematically in Fig. 5. The sleeve 90, which has been previously described as being rotatably mounted on the supporting post, is shown as a shaft 90 carrying the contact plate 44. On the upper end of the shaft is a toothed ratchet gear 116 engaged by a holding tooth 118 on an arm 120 which is held against the ratchet gear by a spring 134 secured to framepiece 82. The teeth of the ratchet are sloped so that the point 118 will catch the teeth and prevent rotation of the ratchet gear 116 in a counter-clockwise direction, but will permit movement in a clockwise direction.

Figure 8:
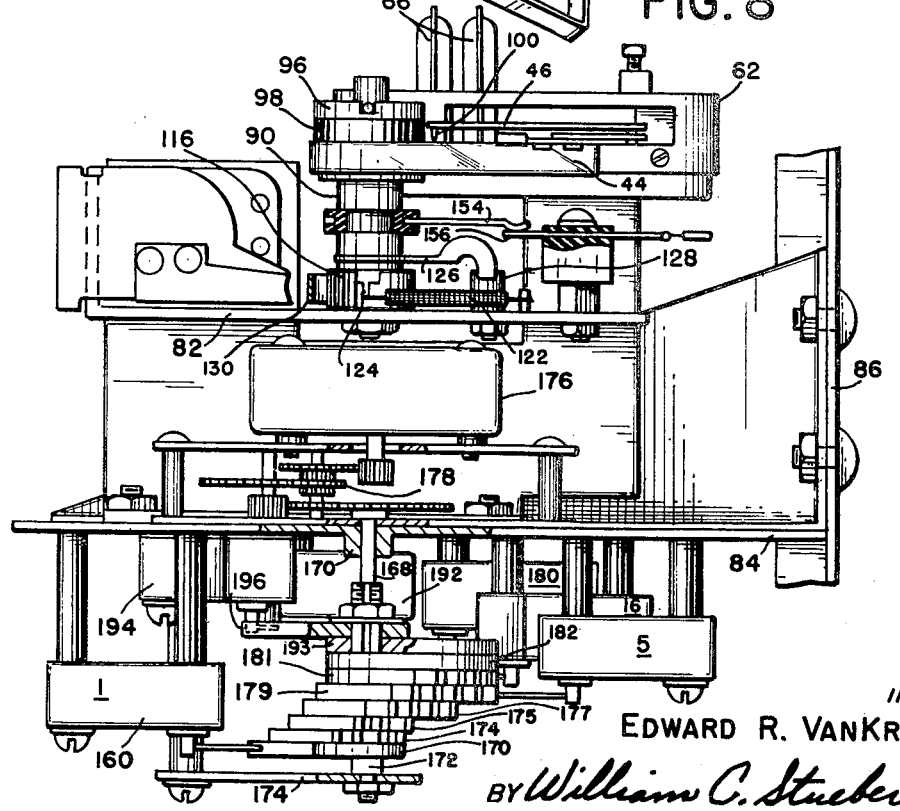
Fig. 8 is a side elevational view taken partially in section and illustrating the selected altitude control mechanism carried by the balloon.

The shaft 90 is biased in the counter-clockwise direction against the holding tooth 118 by a tension spring 122 connected between the frame 82 and a crank arm 124 on the shaft. A stop arm 126 secured to the shaft strikes a fixed stop pin 128 to limit rotation of the shaft in the counter-clockwise direction, as is shown in Figs. 5 and 8. The contact plate 44 is shown in Figs. 1 and 5 being at the limit of its counter-clockwise rotation. In flight it will be rotated to a position where the contact point 100 will cross the contact areas 60 and 54.

The ratchet gear 116 and its shaft and non-conducting plate are indexed in a clockwise direction by an arm 130 carrying a tooth 132. To index the gear, the arm 130 pushes upwardly in Fig. 5, rotating the gear until the holding tooth 118 drops behind the next successive tooth of the gear. At this time the tooth 132 again moves back downwardly to catch another tooth of the gear, thus operating the ratchet in a well known manner. A spring 135 connected between the arm 130 and the arm 138 holds the point 118 in engagement with the ratchet gear. For purposes of reciprocating arm 130 and its tooth 132, the arm is mounted on the end of a pivoting lever 138 which is reciprocated by a Step Coil 148. A spring 136 is connected between the frame 82 and the arm 138 to return it after the action of the coil.

The arm 130 actually is a bellcrank and is pivotally mounted at the end of 138 with its lower arm 140 engaging a fixed stop member 142 when the arm 130 is pulled downwardly. The stop member 142 is unnecessary for ordinary indexing operation but does operate to hold the tooth 132 away from the teeth of the ratchet at the return stroke of each index. With tooth 132 disengaged, tooth 118 can be pulled away from the ratchet gear to permit the shaft 90 to freely rotate back to starting position with the arm 126 against stop 128. The movement of the tooth 118 away from engagement with the ratchet gear is controlled by an electromagnet 144 labeled Reset Coil. The Reset Coil 144 is an electromagnetic coil of a well known type and is connected by leads 146 to a control source of electricity and the electrification of these leads will energize the coil to draw the metallic arm 120 toward the coil drawing the tooth 118 away from the gear 116. The ratchet gear thus released will, under the influence of spring 122, rotate back to starting position, which is the position shown in Fig. 5, with the arm 126 against the stop 128.

To index the sprocket from the position shown in Fig. 5 to the first step, the Step Coil 148 is energized through leads 150. When energized, the metallic arm 138 is drawn toward it, carrying arm 130 upwardly and the tooth 132 will engage between the teeth of the sprocket to rotate it one step in the clockwise direction. The tooth 118 will lock the indexed sprocket in position number 1. At this position switch arm 154 (Fig. 5) will have moved from the solid to the dotted line position. Subsequent re-energization of the Step Coil will cause the sprocket to be indexed another step and so on with subsequent re-energization until the contact plate 44 is in the desired position. Thus it will be seen that the non-conducting plate 44 is indexed clockwise in steps. It is reset counterclockwise by releasing holding tooth 118 to swing all the way back to starting position in one step.

To operate the Reset Coil or the Step Coil, electrical energy is sent to them by completing the circuit between them and a battery (not shown, but contained in the receiver 152). The circuit to these coils is controlled by switches selectively closed by the Radio Command Receiver shown at 152 (Fig. 5).

The Radio Command Receiver is a radio receiver set tuned to receive signals sent from the ground and adapted to perform certain functions in response to signals of different frequencies sent on the carrier frequency. For example, the receipt of a certain frequency by the Radio Command Receiver will cause a switch to close to operate the Reset Coil and a signal of different frequency will cause a switch to close to operate the Step Coil, both rotating the non-conducting plate 44.

The observer or operator from the ground can usually keep track of the position of the contact plate and know at what altitude he has set the balloon to fly. However, in order to avoid accidentally flying the balloon at the wrong altitude, the mechanism transmits back to the ground signals indicating the position at which the altitude control device is set. To achieve this end, the shaft 90 carries a switch arm 154 (Figs. 5 and 8) which successively engages a set of contacts 156, each representing a position of the altitude control plate 44. The present mechanism is shown designed to have six flying altitudes with six contact points to transmit the respective settings of the plate 44. The dotted line position of the switch arm is position number one whereat it contacts the switch contact 158. In this position the switch arm 154 closes the circuit by means of lead 159 through a signal switch 160 shown within a box labeled "1." This switch 160 may be arranged to transmit a particular signal to indicate that the altitude control instrument is set in the first position.

The preferred embodiment shown herein uses the simple method of sending one signal for the first contact position of the instrument and two signals for the second contact position, etc., through position 6. The signal switch 160 is connected by a lead 162 to the radio transmitter 164 in order to transmit the signal back to the ground. This lead 162 is common to the remaining signal switches shown in the boxes numbered "2" through "6." Another lead 166 from the radio transmitter completes the circuit through the switch arm 154.

Figure 7:
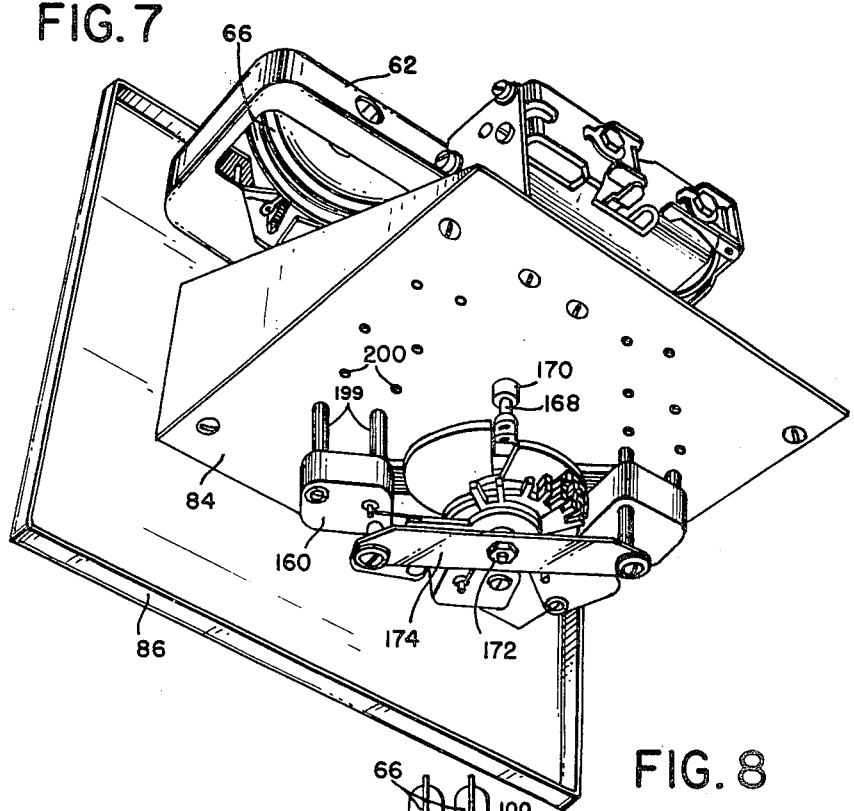
Fig. 7 is a perspective view of the selective altitude control unit carried by the balloon with portions removed for clarity.
Figure 9:
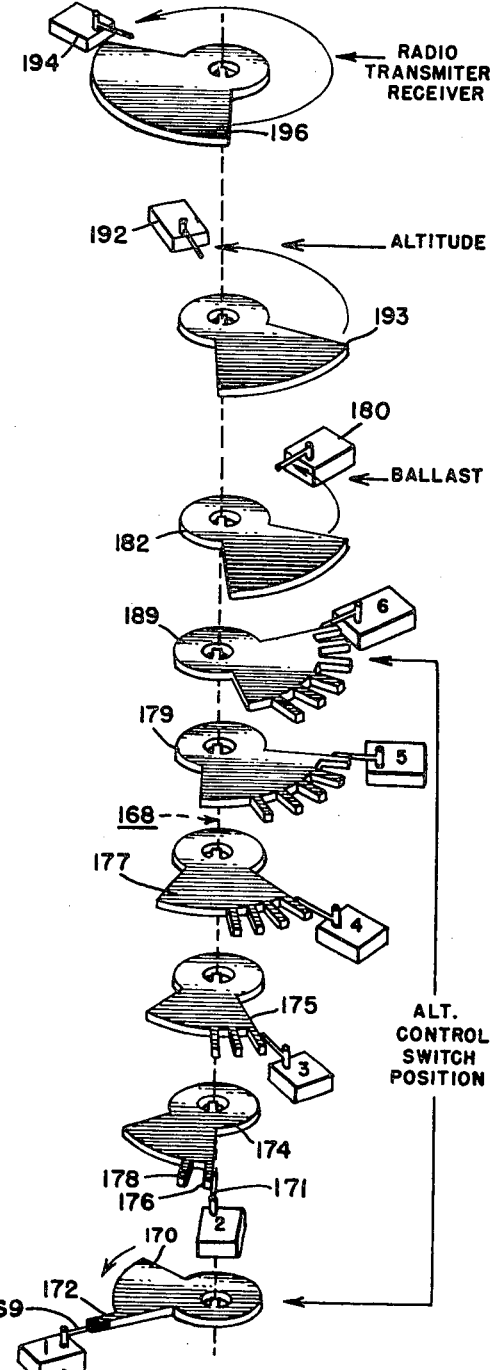
Fig. 9 is an exploded view of the cams used to transmit information of the balloon back to the ground control station.

To generate a single signal for the first position of the altitude control contact plate and to generate multiple signals in accordance with the position of the plate for the other signal switches, a series of cams are mounted on a common cam shaft 168 shown diagrammatically in Figs. 5 and 9, and also shown in Figs. 7 and 8.

In Figs. 7 and 8 the shaft is shown mounted in upper and lower bearings 170 and 172, the upper bearing being carried on plate 84 and the lower bearing being carried on an arm 174 suitably supported from the plate 84. The shaft is rotated by a constant speed motor 176 which drives the shaft through a series of suitable reduction gears, shown generally at 178. The motor is driven by a current obtained from storage batteries, not shown, and operates at a constant slow speed to turn the cam shaft 168. A speed of about one revolution in two minutes is chosen for the present mechanism, although any practical speed may be selected.

Figure 6:
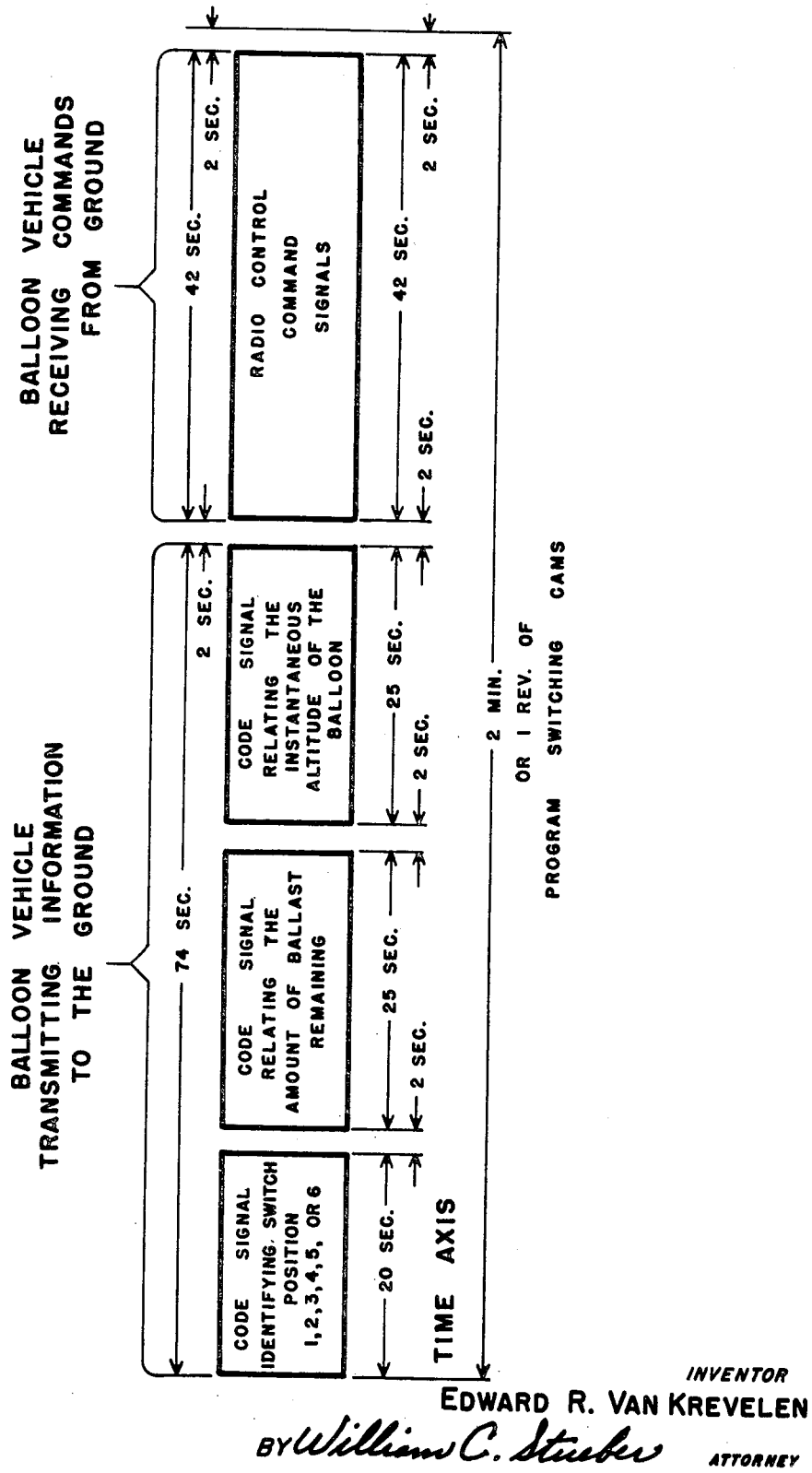
Fig. 6 is a schematic diagram illustrating the program of the cycling device for transmitting and receiving control signals.

The cam shaft 168 is constructed to rotate the cams operating the signal switches and to carry other program cams which determine the cycle of the apparatus and determine whether the apparatus will be receiving or transmitting. The radio equipment is used for either the receipt of altitude command signals from the ground or for the transmission of information relating to the balloon back to the ground. The operation of the radio as a transmitter or receiver is accomplished by the programming switches which change it to operate on section 152 or 164 of the radio, both of which use the same antenna 179, programming the function of the apparatus over a period of time. An example of a program that may be used is shown in Fig. 6.

As will be seen, in the two minutes required for one complete revolution of the cam shaft in the preferred embodiment of the invention, the radio equipment is first programmed to transmit to the ground information concerning the balloon. The first 74 seconds shown in the span of time entitled Balloon Vehicle Transmitting Information to the Ground is divided into three periods (see Fig. 6). In the first period, which is chosen to run for 20 seconds, the balloon radio equipment transmits the code signal which indicates to the operator on the ground the position of the balloon altitude control plate 44.

The next signal that the radio apparatus transmits to the ground is a code signal relating the amount of ballast which remains in the ballast container. There is a lapse of two seconds between the two signals and this amount of time is arbitrarily chosen and may be longer or shorter. This signal run for 25 seconds as is shown in Fig. 6.

The third signal which is transmitted back to the ground is the signal relating the actual altitude of the balloon at the given instant and the signal runs for 25 seconds. It will be seen that other signals may be transmitted back to the ground, such as temperature, humidity, etc., by adding devices to measure these quantities and by changing the programming of the radio operation to include these in the cycle.

When the radio has transmitted the information concerning the balloon back to the ground, it automatically switches over to receive command signals from the observer on the ground. The radio remains in the command receiving position for 42 seconds, as shown in Fig. 6. The operator on the ground, of course, will transmit the command signal only when the programming switch in the balloon is set in command position. This position is easily determined by the operator by his observing whether or not he is receiving signal transmission from the balloon.

Turning now to Figs. 5 and 7 through 9, the mechanism for generating a signal in accordance with the position of the altitude control plate 44 will be described. Each of the signal switches shown in the boxes containing the numerals "1" through "6" is engaged by a signal cam which closes the switch the number of times corresponding to the position that the switch represents. Signal switch 1, for example, is closed once each cycle and sends one signal to the ground, indicating that the contact plate is in the first position. Signal switch 5 is closed five times each cycle to send five signals to the ground, indicating that the contact plate is in position 5. As is shown in Fig. 9, the signal switches have a switch arm 169 which extends into the path of a cam 170. As the tooth 172 on the cam engages the switch arm, it briefly closes the switch to send an impulse through the radio transmitter which is transmitting to the ground. Each cam for the successive switches 2 through 6 has one additional tooth so that cam 174 which is for switch 2 has two teeth 176 and 178 which engage the arm 171 two times in succession to close the switch twice and cause two signals to be sent to the ground. The remaining switches are similar in operation. The signal generated may be an audio frequency signal and modulated by the carrier frequency to be sent to the ground where a receiver converts it to audio to be heard. The position signal switches are continually in circuit with the radio transmitter but are actuated only at the beginning of the two-minute cycle and are silent for the remaining portion of the cycle. They therefore can be kept in the circuit.

As the cam shaft continues to rotate, the next signal which is sent to the ground according to the chart of Fig. 6 is a code signal relating to the amount of ballast remaining. The circuit to the radio transmitter for measuring the ballast is completed by a switch 180 closed by its arm being engaged by a cam 182, see Fig. 9.

As is shown in Fig. 5, the signal for telemetering the amount of ballast remaining to the ground is obtained from a Ballast Gauge 184 which may be of any type known to the art suitable for measuring amount of ballast. Connected to the ballast gauging instrument is a Ballast Remaining Transducer 186 which converts the mechanical measurement of the ballast gauge into an electrical signal having a characteristic whereby the operator on the ground receiving the signal will know how much ballast remains. For example, the ballast remaining transducer may generate a signal in Morse code indicating the amount of ballast remaining and the code signal may be transmitted via carrier radio frequency by the transmitter to be received on the ground and converted by the receiver to an audio frequency signal which may be read by the operator.

The next signal sent to the operator on the ground according to the chart of Fig. 6 is a code signal relating to the instantaneous altitude of the balloon. The altitude is measured by an Altitude Gauge 188 (Fig. 5) and the mechanical measurement is converted to an electrical signal by the Altitude Transducer 190. The signal may be in code or may be any suitable changeable signal indicative of the actual altitude of the balloon. The signal generated by the altitude transducer is placed in circuit with the radio transmitter by the closing of the altitude signal cam switch 192 by cam 193 and the radio transmitter sends the signal to the receiver on the ground.

At this point, as indicated by the chart in Fig. 6, the balloon vehicle has completed the transmission of information to the ground and is ready to receive the command signal. To accomplish this, the radio 26 is changed so that the transmitter section 164 will cease to operate and the receiver section 152 will be placed in operation. This is accomplished by the radio transmitter-receiver cam switch 194. This switch is actuated at the appropriate time by the cam 196, as indicated in Fig. 9. During the time the arm of the switch is engaged, the radio will act as a receiver and any signals which may be sent from the ground will operate either the Step Coil 148 or the Reset Coil 144.

Referring to Figs. 7 and 8, wherein the mechanical parts are shown in detail, it will be seen that the cams numbered 170, 174, 175, 177, 179, 181, 182, 193 and 196 for generating signals in accordance with the position of the altitude control switch and for programming the signals are stacked one on top of the other and keyed to the cam shaft 168. The switches, operable by the cams, are arranged radially around the cam shaft, as illustrated by switches 160, 194, 192, 180, 181, 186 and 185. The remaining switches are removed for sake of clarity of the drawing, all being similarly arranged around the cam shaft and being mounted by bolts 199 (Fig. 7) secured in the holes 200 in the plate 84 arranged radially around the shaft. Thus, as the cam shaft rotates, the appropriate cams strike their switches in the proper order so as to program the signals which are to be sent to or received from the ground.

Returning to Fig. 5, in the last position of the altitude control plate 44, the switch arm 154 will be engaging its last contact 201. This will place the switch 6 in circuit with the radio transmitter for sending the 6-impulse signal to the ground. It will also complete the circuit to box number 202 which contains the releasing squib for releasing the flight. This may be an electrical detonating cap or similar apparatus known to the balloon art for terminating the flight of the balloon. The squib operates to damage the balloon or to release the payload from the balloon.

Thus it will be seen that I have provided a balloon altitude control mechanism which functions to selectively set the floating altitude of the balloon and to automatically keep the balloon at that altitude by releasing gas when the balloon gets too high and by discharging ballast when the balloon gets too low. It will be recognized that the device would be operative with any type of apparatus which is capable of changing the free lift of the balloon and is not to be restricted to a ballast release or gas release operation or to use with both. That is, the solenoid gas valve could be omitted and the device be operative with only a ballast release valve. This latter adaptation is quite practical since the balloon normally loses free lift with the passage of time due to diffusion of gases through the balloon material and a gas release valve is not essential.

Further, I have provided mechanism for controlling the altitude of the balloon from the ground which not only transmits back to the ground the information regarding the balloon and the surrounding atmosphere, but also transmits back the position of the altitude control switch so that the operator may immediately know at which altitude he has set the balloon to float. It will be seen that the mechanism is simple and compact and may be simply constructed to form a very light-weight apparatus which is of great importance in providing mechanism to accompany a balloon in flight. The apparatus shown fully meets the objectives set forth in the beginning of the application and is capable of use in numerous applications.

I have, in the drawings and specification, presented a detailed disclosure of the preferred embodiment of my invention, but it is to be understood that as the invention is susceptible of modifications, structural changes and various applications of use within the spirit and scope of the invention. I do not intend to limit the invention to the specific form disclosed but intend to cover all modifications, changes and alternative constructions and methods falling within the scope of the principles taught by my invention.

I claim as my invention:

1. An apparatus for controlling the altitude of a balloon from a position remote from the balloon comprising means operated by a first electrical circuit to change the free lift of the balloon by releasing lifting gas from the balloon, means operated by a second electrical circuit to change the free lift of the balloon by releasing ballast from the balloon, a first and a second contact each of which is connected to one of said electrical circuits, a contact point movable to engage the first or second contact in response to a condition of pressure to complete one of said electrical circuits and cause the balloon to descend or to rise, and means responsive to a signal remote from the balloon to change the position of said first and second contacts thereby change their position relative to the contact point and change the circuit which is completed to thereby change the flying altitude of the balloon.

2. An apparatus for controlling the altitude of a balloon from a remote position comprising apparatus for changing the free lift of a balloon in flight, a member responsive to changes in altitude and adapted to cause operation of said lift changing means at a certain altitude, a second member also adapted to cause operation of said lift changing means in response to a signal from the ground, and means to send an altitude control signal from the ground.

3. An apparatus for controlling the altitude of a balloon from a position remote from the balloon comprising free lift changing means supported by the balloon in flight and adapted to change the free lift of a balloon, command receiving means supported by the balloon and operably connected to said lift changing means to cause operation of same or to cause a cessation of operation, with the receipt of a command and command sending means operable from a remote position to send signals to the balloon to be received by said receiving means to control operation of the lift change means and change the free lift of the balloon.

4. An apparatus for controlling the altitude of a balloon from a remote position comprising a device to change the free lift of a balloon, an altitude-responsive member which changes positions with change in altitude, an altitude control member capable of cooperating with the altitude-responsive member when said members are in operative positions to operate the device for changing free lift command receiving means operable to change the position of said altitude control member to cause it to cooperate with the altitude-responsive member to change the free lift or to cease such cooperative operation and means to send a signal to the command receiving means.

5. An apparatus for controlling the altitude of a balloon from a remote position comprising a device to change the free lift of a balloon, an electrical means for operating the lift changing device and being operative on the closure of a circuit, a member having a non-conductive area and a conducting area which is in said circuit, a contact point riding on said areas and also in said circuit, altitude responsive means controlling the position of the contact point to move the point on the conducting area to close the circuit and cause a change in free lift or to move the point onto the non-conducting area to open the circuit, signal receiving means for moving the areas to cause the contact point to move on or off the conducting area in response to a signal, and a signal transmitter to send a signal to the receiving means and thereby move the areas and control the altitude of the balloon by changing the free lift.

6. An apparatus for controlling the altitude of a balloon comprising means for changing the free lift of a balloon while in flight, means for operating the lift changing means being operable by an electrical circuit, a contact plate having a first conducting area in said electrical circuit and a second area not in the circuit, a contact point having its position controlled by the balloon altitude to complete the circuit when engaging said first conducting area, mechanism for changing the position of the conducting area with respect to the contact point in response to a signal, and apparatus remote from the balloon to generate the signal and change the altitude of the balloon.

7. An apparatus for controlling the altitude of a balloon from a remote position comprising a contact point having its position controlled by a pressure responsive device, a plate against which the contact point bears having a conducting zone and a non-conducting zone, a pivotal mounting for the plate permitting movement of the plate relative to the contact point, means for changing the free lift of the balloon, an electrical circuit for operating the lift changing means, said circuit being completed when the contact point is on said conducting area of the plate, the conducting area being so shaped that pivotal movement of the plate will move the point between the conducting and the non-conducting zone, and means responsive to a signal remote from the balloon to cause pivotal movement of the plate.

8. An apparatus for controlling the altitude of a balloon comprising an apparatus for changing the free lift of a balloon, an electrical circuit arranged to operate said lift change apparatus, a plate having a non-conducting area and an electrical conducting area and being in said electrical circuit, a contact arm engaging the plate and being in said electrical circuit, altitude change responsive means operatively connected to the arm to move it relative to the conducting area, signal-responsive means adapted to change the positions of the plate relative to the contact arm so that the contact arm will engage either the conducting or non-conducting areas and signal generating means remote from the balloon to actuate the signal-responsive means to change the position of the plate and cause the arm to selectively engage either the conducting or non-conducting areas to thereby change the free lift of the balloon and cause a change of altitude.

9. An apparatus for controlling the altitude of a balloon comprising apparatus for increasing and apparatus for decreasing the free lift of a balloon, an electrical circuit associated with the lift change apparatus to change the lift when the circuit is completed, a plate having conducting areas with one area being in circuit with the lift increasing and another being in circuit within the lift decreasing apparatus, a non-conducting area between the conducting areas, a contact arm engagaing the plate, altitude responsive means operative to move the arm relative to said areas, the arm moving to the area in circuit with the apparatus for decreasing the lift when the balloon rises above the desired height, and moving to the area in circuit with the apparatus for increasing the lift when the balloon falls below the desired height, signal responsive means operative to change the position of the plate and its areas with respect to the arm so that it will engage the respective areas at a different point in its movement and at a different altitude, and signal means remote from the balloon to operate the signal responsive means and control the height at which the balloon floats.

10. An apparatus for controlling the altitude of a balloon comprising an electrically operated means for increasing the free lift of a balloon and a second electrically operated means for decreasing the free lift of a balloon, a plate carrying a first and a second contact area respectively in circuit with said first and second free lift changing means, the plate being mounted for controlled pivotal movement, a contact point in circuit with an electrical current supply and being controlled to move radially across the plate, altitude responsive means for controlling the position of the contact point relative to the plate, signal responsive means adapted to change the pivotal position of the plate relative to the contact point, a narrow insulating zone on the plate between the contact areas formed of a series of segments substantially arcuately shaped and each successive segment being closer to the pivotal center of the contact plate with the ends of the segments joined by substantially radial segments whereby pivotal movement of the plate in one direction will cause the contact point to cross a radial segment to engage a different contact area and movement of the contact point in one direction will cause the point to cross an arcuate segment to contact a different contact area, and a signal transmitting radio remote from the balloon designed to actuate the signal responsive means to pivot and change the position of the contact plate and thereby change the controlled floating altitude of the balloon.

11. An apparatus for controlling the altitude of a balloon comprising means for changing the free lift of a balloon while in flight, an electrical circuit for actuating the lift change means, a plate having a first conducting area in said electrical circuit and a second area not in said circuit, a contact point bearing on the plate and engageable with the first conducting area to complete the circuit engageable with the second area to break the circuit, apparatus for changing the position of the contact plate with respect to the contact point comprising a ratchet operated by a magnetic drive being electrically operated by a signal responsive circuit, and a signal generating means positioned remote from the balloon to transmit a signal to the balloon to cause operation of said ratchet and change the position of the contact plate to change the floating position of the balloon.

12. An apparatus for controlling the altitude of a balloon comprising electrically operated means for changing the free lift of a balloon, a plate having a conducting area in circuit with the lift changing means and a nonconducting area, a contact point also in circuit with the lift changing means and engaging said plate and adapted to change its position with respect to said areas with balloon altitude, means to change the position of the plate in increments with respect to the contact point in response to a signal received, the contact area being shaped so that a change in position of the plate will change the altitude at which the point moves off the conducting area, a series of switches adapted to generate a signal corresponding to the position of the contact plate, means for transmitting the signal generated to a point remote from the balloon so that the position of the contact plate may be known, and means remote from the balloon to generate a signal receivable by the plate positioning means for changing the position of said plate to thereby change the altitude of the balloon.

13. A balloon altitude control device comprising means for changing the free lift of a balloon to maintain it at a predetermined constant flying altitude, control means connected to the lift changing means and responsive to the altitude of the balloon to operate the lift changing means when the altitude of the balloon deviates from a selected altitude, altitude selection switch means operative in cooperation with the control means and having a series of contact positions with each position operative to cause the balloon to fly at an altitude corresponding to the position selected, means operative in response to a signal to change the switch position of the altitude selection means, and apparatus connected to one of the switch contact positions and operative at said position of the altitude selection means for terminating the flight.

14. A balloon altitude control device comprising means for changing the free lift of a balloon to control its floating altitude, altitude control means for operating the lift change means having a plurality of control positions to change the altitude at which the balloon will fly, means generating a signal in accordance with the position of said altitude control means, a remote transmitter-receiver for generating a signal to set the position of the altitude control means and for receiving the position signal from the signal generating means, and a transmitter receiver unit carried on the balloon programmed to alternate between transmitting a signal of the position of the altitude control means and receiving the signal to set the position of the altitude control means.

15. An apparatus for controlling the altitude of a balloon comprising apparatus for changing the free lift of a balloon to control its altitude in flight, apparatus responsive to a signal received from the ground to select the altitude at which the balloon will fly by controlling said lift changing means, a radio receiver transmitter unit carried by the balloon for receiving a ground signal and for transmitting information from the balloon, means carried by the balloon and supplying to the radio information relating to conditions surrounding the balloon, and cycling means for altering the radio to cause it to alternately receive altitude control ground signals or to send signals received for said information supplying means in a predetermined order.

16. An apparatus for controlling the altitude of a balloon, including means for changing the free lift of a balloon in response to changes in altitude to keep the balloon at a constant altitude, altitude selecting means for selectively controlling the lift changing means to select the altitude at which the balloon will fly, a series of position switches each corresponding to a position of the altitude selecting means, a receiver-transmitter for signal transmission and reception for operating the altitude selecting means, and a common cam shaft carrying a plurality of switch closing cams, one group of cams having separate cams each corresponding to a position of the altitude selecting means and operating the corresponding position switch, another group of cams being program cams and having corresponding switches which control the receiver transmitter and cause it to alternately receive altitude control signals and to send position signals generated by the position switches.

17. An apparatus for controlling the altitude of a balloon comprising means to decrease the free lift of a balloon by releasing gas from the balloon, means to increase the free lift of a balloon by dropping ballast, and means responsive to change in air pressure and adapted to automatically cause operation of the lift decrease means when the balloon rises above said predetermined altitude and the air pressure drops below a predetermined level and to automatically cause operation of the lift increasing means when the balloon descends below said predetermined altitude and the ambient air pressure increases above a predetermined level.

18. An apparatus for controlling the altitude of a balloon comprising a gas release valve for decreasing the free lift of a balloon by releasing gas from the balloon, ballast release apparatus for increasing the free lift of a balloon by releasing ballast, an apparatus responsive to change in altitude and adapted to automatically cause operation of the gas release valve when the balloon rises above a certain altitude and to automatically cause operation of a ballast release apparatus when the balloon descends below said certain altitude thereby causing the balloon to float at a continuous selected altitude, means responsive to predetermined signals and operatively associated with said altitude change responsive means and operable on receipt of a predetermined signal to change said certain altitudes, and signal means remote from the balloon for transmitting altitude selection signals to the signal responsive means, to remotely select the floating altitude of the balloon.

19. An apparatus for controlling the altitude of a balloon comprising means to decrease the free lift of the balloon by releasing gas therefrom, means to increase the free lift of the balloon by releasing ballast, means responsive to the rise of the balloon above a first predetermined altitude and operative to automatically cause operation of the free lift decreasing means when the balloon rises above said first predetermined altitude, and means responsive to the descent of the balloon to a position below a second predetermined altitude and operative to automatically cause operation of the free lift increasing means to cause the balloon to return to said second predetermined altitude, said first predetermined altitude being higher than said second predetermined altitude and said predetermined altitudes spaced from each other so that the lift decreasing means and the lift increasing means will remain inactive while the balloon is in the zone between said first and second predetermined altitudes.

20. An apparatus for controlling the altitude of a balloon comprising means for changing the free lift of a balloon, means for sensing change in ambient air pressure and operatively connected to the lift changing means to cause operation of the lift changing means when the balloon deviates from a predetermined altitude to cause it to return to said altitude, a predetermined altitude establishing element operatively associated with the air pressure change responsive means and establishing the predetermined altitude from which the deviations in altitude of the balloon are sensed, and an altitude changing mechanism operatively connected to the altitude establishing element and being selectively changeable to establish different predetermined altitudes to thereby select the floating altitude of the balloon.

References Cited in the file of this patent
UNITED STATES PATENTS

| | | |
|---|---|---|
| 1,225,139 | Korzeniewski | May 8, 1917 |
| 1,286,178 | Halsey | Nov. 26, 1918 |
| 1,682,961 | Hall | Sept. 4, 1928 |
| 2,341,351 | Barkley | Feb. 8, 1944 |
| 2,421,106 | Wight | May 27, 1947 |
| 2,556,345 | Sivitz | June 12, 1951 |